United States Patent
Haase

(10) Patent No.: US 10,271,207 B2
(45) Date of Patent: Apr. 23, 2019

(54) WIRELESS DONGLE AND METHOD FOR WIRELESSLY TRANSMITTING DATA FROM A COMPUTER TO AT LEAST ONE FIELD DEVICE

(71) Applicant: Endress+Hauser Conducta GmbH+Co. KG, Gerlingen (DE)

(72) Inventor: Björn Haase, Stuttgart (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 159 days.

(21) Appl. No.: 15/379,680

(22) Filed: Dec. 15, 2016

(65) Prior Publication Data
US 2017/0171746 A1    Jun. 15, 2017

(30) Foreign Application Priority Data

Dec. 15, 2015 (DE) .......... 10 2015 121 809

(51) Int. Cl.
| | |
|---|---|
| *H04L 9/00* | (2006.01) |
| *H04W 12/02* | (2009.01) |
| *H04W 76/10* | (2018.01) |
| *H04W 4/80* | (2018.01) |
| *G06F 21/86* | (2013.01) |

(Continued)

(52) U.S. Cl.
CPC .......... *H04W 12/02* (2013.01); *G06F 21/606* (2013.01); *G06F 21/86* (2013.01); *H04L 9/10* (2013.01); *H04L 63/0442* (2013.01); *H04L 63/0492* (2013.01); *H04W 4/80* (2018.02); *H04W 12/06* (2013.01); *H04W 76/10* (2018.02); *G06F 7/588* (2013.01); *H04W 84/18* (2013.01)

(58) Field of Classification Search
CPC ....... H04W 12/02; H04W 4/80; H04W 12/06; H04W 12/04; H04W 88/02
See application file for complete search history.

(56) References Cited

U.S. PATENT DOCUMENTS

2007/0291946 A1* 12/2007 Ohtsu .................. H04L 63/061
                                                   380/270
2010/0022217 A1    1/2010 Ketari
(Continued)

FOREIGN PATENT DOCUMENTS

DE    10 2014 106 727 A1    11/2015

OTHER PUBLICATIONS

Search Report for German Patent Application No. 10 2015 121 809.7, German Patent Office, dated Sep. 7, 2016, 9 pp.

*Primary Examiner* — Ghazal B Shehni
(74) *Attorney, Agent, or Firm* — Mark A. Logan; PatServe

(57) ABSTRACT

The present disclosure relates to a wireless dongle for the wireless transmission of data from a computer to at least one field device of a process automation system. The dongle includes a connection interface for connecting the dongle to a computer, a wireless interface for transmitting the data from the dongle to a field device, a memory, an arithmetic unit configured to generate and test signatures and release codes, as well as to perform encryption, and a housing, wherein the wireless interface, the memory, the arithmetic unit, and the connection interface are arranged in the housing, wherein only the part of the connection interface relevant for the connection to the computer is omitted from the housing. The present disclosure further relates to a method for wirelessly transmitting data from a computer to a field device.

13 Claims, 2 Drawing Sheets

(51) Int. Cl.
  *H04L 9/10*   (2006.01)
  *H04L 29/06*  (2006.01)
  *H04W 12/06*  (2009.01)
  *G06F 21/60*  (2013.01)
  *G06F 7/58*   (2006.01)
  *H04W 84/18*  (2009.01)

(56) References Cited

U.S. PATENT DOCUMENTS

2013/0124877 A1\* 5/2013 Saito .................. H04L 67/1097
                                                        713/193
2014/0380445 A1   12/2014 Tunnell et al.

\* cited by examiner

WIRELESS DONGLE AND METHOD FOR WIRELESSLY TRANSMITTING DATA FROM A COMPUTER TO AT LEAST ONE FIELD DEVICE

CROSS-REFERENCE TO RELATED APPLICATION

The present application is related to and claims the priority benefit of German Patent Application No. 10 2015 121 809.7, filed on Dec. 15, 2015, the entire contents of which are incorporated herein by reference.

TECHNICAL FIELD

The present disclosure relates to a wireless dongle for the wireless transmission of data from a computer, including a personal computer, laptop, notebook, or tablet, to at least one field device of the process automation system. In addition, the present disclosure relates to a corresponding method.

BACKGROUND

Field devices serving to capture and/or modify process variables are frequently used in process automation technology. Field devices, in general, refer to all devices which are process-oriented and which provide or edit process-relevant information. In addition to sensors and actuators, units directly connected to a fieldbus are also generally referred to as field devices and serve for communication with higher-level units, such as, for instance, remote I/Os, gateways, linking devices, and wireless adapters.

The Endress+Hauser Group offers and distributes a large variety of such field devices.

Within industry as well, forgoing wired data transmission to connect a field device has the potential of reducing the cost of cabling, improving serviceability, and thereby generating benefit for the user. In industrial applications, information security is generally considered more important than in classical consumer applications. One reason that wireless solutions are not yet universally accepted within industry is because there are ongoing reservations arising from insufficient data security.

Wireless solutions are already available for many consumer applications. One example is wireless solutions based upon one of the standards from the Bluetooth family. With regard to measuring technology applications in the consumer area, the prior art offers solutions such as the wireless transfer of an athlete's heart rate or the number of steps to a mobile display/control unit, e.g., to a mobile phone with an integrated Bluetooth interface.

Encryption is usually executed via a so-called "pairing process," during which a secret key is exchanged between the two communication partners. Due to the limitations of the remote stations, this key exchange usually occurs only on the basis of an authentication using a key code of only 4 digits. These 4 digits frequently are set to an (unalterable) standard value, e.g., 0000, especially for measuring devices without a display, such that security is further reduced. This type of authentication optimizes operating convenience for the consumer client at the expense of security. Such minimal security is not sufficient for the security levels required for industrial plants.

For the user, it is convenient and easy to address and configure or parameterize the respective field device with a computer. For example, the advantages of an infrastructure with high computing power together with ease of operation by a mouse, keyboard, and screen can be exploited to configure corresponding field devices, even in the field, before actual use. Local parameterization with a mobile computer is also a conventional method.

Frequently, not just in the latter case, but also with stationary computers, security is not ensured. The operating system may be outdated, and an antivirus scanner may not be installed or up-to-date. Furthermore, the memory, such as the hard disk, does not offer sufficient protection against readout in the case of theft. Accordingly, the computer cannot perform secure encryption operations, e.g., because there may be a Trojan or a viral attack on the memory, such as the RAM.

Many computers are flexible in terms of potential peripheral devices. However, any existing wireless interface, such as a Bluetooth interface, is not optimized for industrial applications, e.g., with regard to the power budget on the part of the field device.

As a consequence, a computer is unable to fulfill the special requirements for security and for a wireless interface and is, therefore, unsuitable for industrial applications.

SUMMARY

The object of the present disclosure is a device that enables a field device to be securely and easily configured.

The object is achieved with a wireless dongle for the wireless transmission of data from a computer to at least one field device of the process automation system, comprising: a connection interface, including a USB interface, for connecting the wireless dongle to the computer; a wireless interface for transmitting the data from the wireless dongle to the field device; a memory on which at least one key can be saved; an arithmetic unit that is designed to generate and test signatures and release codes, as well as to perform at least one asymmetrical encryption; and a housing, wherein the wireless interface, the memory, the arithmetic unit, and the connection interface are arranged in the housing, wherein only the part of the connection interface relevant for the connection to the computer is omitted from the housing.

By means of the wireless dongle, it is possible to parameterize one or more field devices easily and in a user-friendly manner from a computer. By using the encryption, these parameters are secure against attackers.

Preferably, the wireless interface is a Bluetooth interface. The Bluetooth interface is sufficient for the low energy protocol stack. This is an energy-saving interface.

To prevent potential attackers from being able to modify the hardware of the wireless dongle, the wireless dongle, in one advantageous embodiment, is cast.

Moreover, the wireless dongle comprises protective measures for recognizing manipulation of the housing, such as removal of the housing. Should an attacker attempt to remove the wireless dongle, these protective measures come into play, and the duplicate is ultimately rendered harmless for use.

To further increase security, the wireless dongle comprises a random number generator in the hardware. Random numbers are needed for secure encryption; random number generator hardware ensures secure random numbers.

The object is further achieved by a method for the wireless transmission of data from a computer to at least one field device of the process automation system, comprising a wireless dongle as described above. The method comprises the following steps: connecting the wireless dongle to the computer; establishing a bi-directional wireless connection between the wireless dongle and field device; authenticating the wireless dongle on the field device using a key, wherein the key is saved on the wireless dongle; transmitting a data block from the field device to the wireless dongle when authentication by means of the key is successful, wherein both the authentication as well as the transmission of the data block are protected from eavesdropping by an asymmetrical encryption method, including using hybrid encryption; and transmitting the data from the wireless dongle to the field device.

In an embodiment, the asymmetrical encryption method comprises a method based upon algorithm class RSA, a digital signal algorithm (DSA) based upon prime elements, and/or a digital signal method based upon elliptical curves (ECDSA). These are conventional and secure encryption methods.

In another embodiment, the method comprises steps for executing wireless dongle protective measures against side channel attacks, including run-time smoothing by constantly running code such as inserting redundancies, so as to execute machine commands independently of data and avoid conditional jumps, randomization of power consumption, physical protective measures against electromagnetic radiation, and/or insertion of noise such as code obfuscation, grid obfuscation, and/or signal noise. This makes it more difficult for an attacker to crack the connection.

In an embodiment, the authentication of the wireless dongle by the field device is performed as a multi-factor authentication, including a two-factor authentication, including at least the factors of the password and wireless dongle or wireless dongle key. This creates a multilayer defense. Unauthorized persons therefore have a more difficult time gaining access to the connection. If one factor is compromised or malfunctioning, the attacker must deal with at least one other barrier in order to successfully penetrate.

BRIEF DESCRIPTION OF THE DRAWINGS

The present disclosure is explained in more detail with reference to the following figures.

These show.

DETAILED DESCRIPTION

In the figures, the same features are marked with the same reference symbols.

Figure 1:
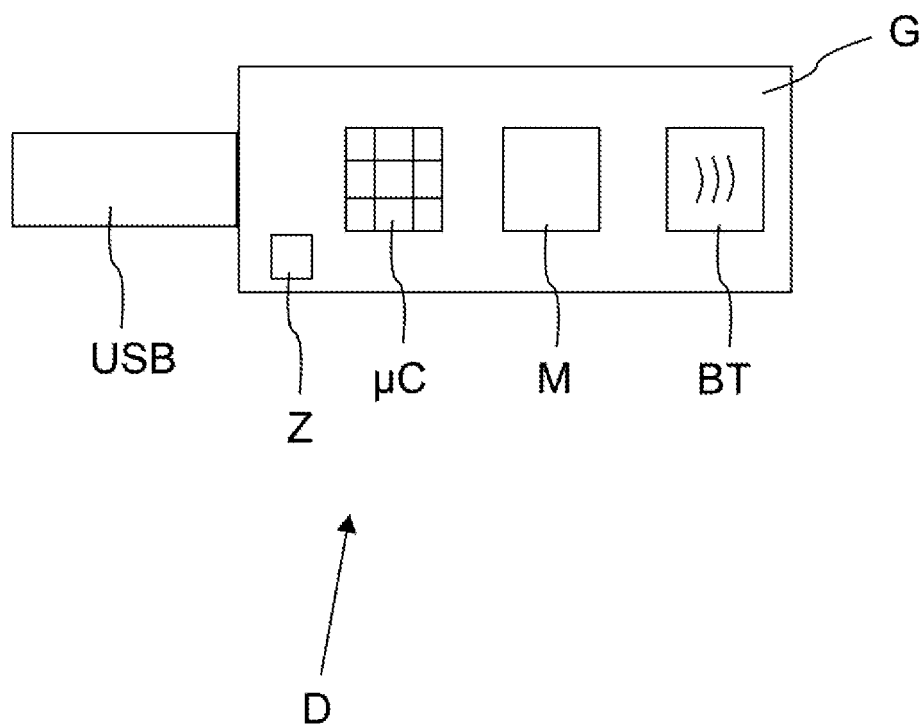
FIG. 1 shows the wireless dongle according to the present disclosure.

The overall wireless dongle according to the present disclosure is marked with the reference symbol D and is shown in FIG. 1.

The wireless dongle D comprises a connection interface USB. The connection interface USB is, for example, a USB interface, a firewall interface, or a thunderbolt interface. The wireless dongle D can be connected to a computer C by means of this interface USB.

The wireless dongle D further comprises a wireless interface BT for transmitting data from the wireless dongle D or computer C to a field device FG. The interface BT is, for example, designed as a Bluetooth interface, WLAN interface, or a wireless connection based upon the wireless standard IEEE 802.15.4, such as Zigbee. Bluetooth is preferably used. The Bluetooth interface satisfies the low energy protocol stack as "Bluetooth Low Energy" (also known as BTLE, BLE, or Bluetooth Smart). The field device FG therefore at least satisfies the "Bluetooth 4.0" standard.

The wireless dongle D further comprises an arithmetic unit µC and a memory M. At least one key can be saved in the memory. The arithmetic unit µC is designed to generate and test signatures and release codes, as well as to perform at least one asymmetrical encryption.

The wireless dongle D comprises a housing in which are arranged the wireless interface BT, the memory, the arithmetic unit µC, and the connection interface USB. Only that part of the connection interface USB relevant for connecting to the computer C is omitted from the housing. The wireless dongle D is encapsulated or cast such that it is impossible to open the wireless dongle without destroying the parts relevant for operation. Moreover, the wireless dongle D comprises, for example, protective measures for recognizing manipulation of the housing, such as removal of the housing.

Furthermore, the wireless dongle comprises a hardware random generator Z.

Figure 2:
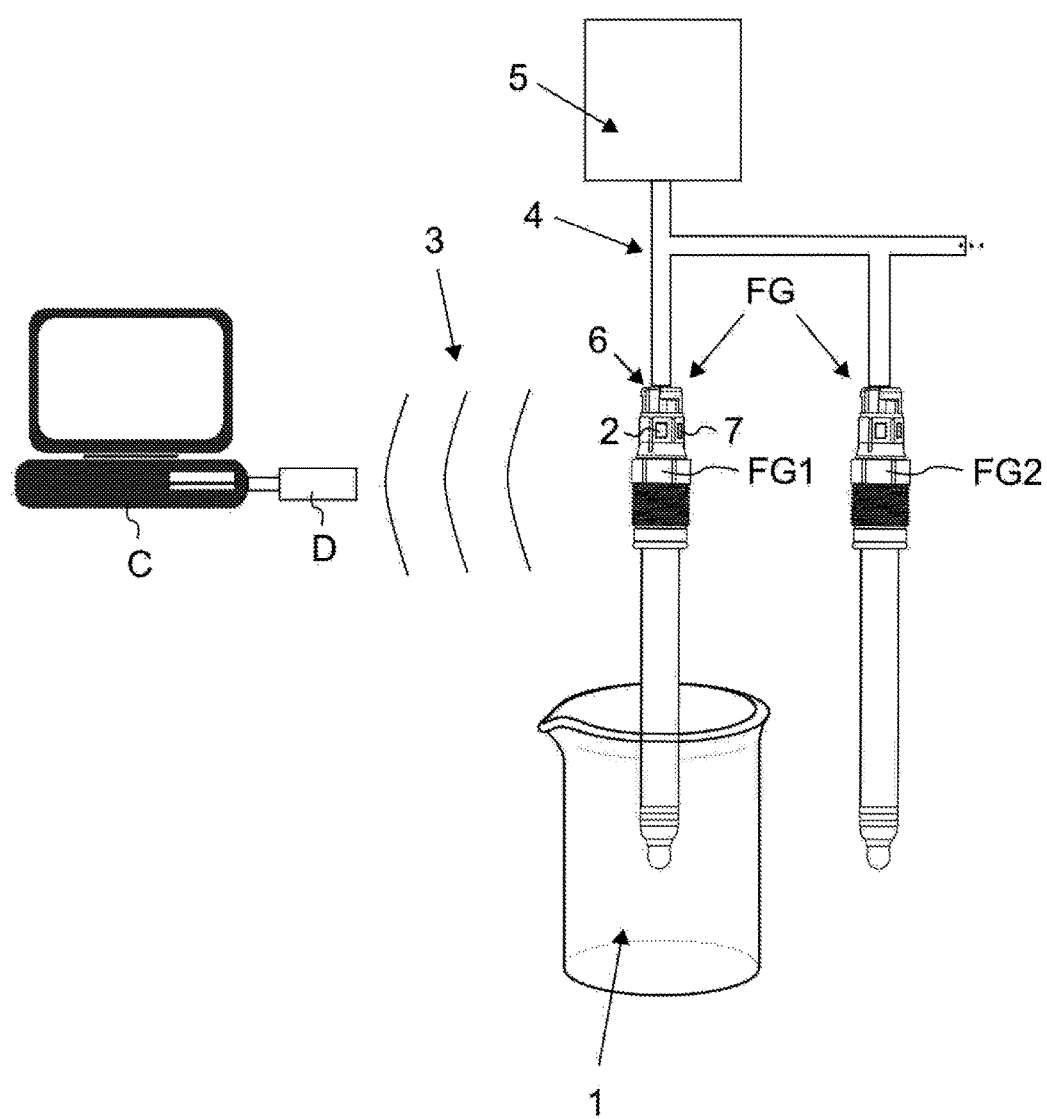
FIG. 2 shows the wireless dongle according to the present disclosure in an application.

FIG. 2 shows an application of a wireless dongle D.

In particular, two field devices FG1 and FG2 are shown. The sensor is, for example, a pH sensor, a redox potential or ISFET sensor, a temperature sensor, a conductivity sensor, a pressure sensor, an oxygen sensor, especially a dissolved oxygen sensor, or a carbon dioxide sensor; an ion-selective sensor; an optical sensor, especially a turbidity sensor, a sensor for optical determination of oxygen concentration or a sensor for determining the number of cells and cell structures; a sensor for monitoring certain organic or metallic compounds; a sensor for determining the concentration of a chemical substance, e.g., a certain element or a certain compound; or a biosensor, e.g., a glucose sensor. The field device FG determines the measuring value of a medium 1 in—in the example shown—a beaker. However, other containers such as leads, pools, containers, pipes, pipelines, etc., are possible.

The field device FG communicates with a higher-level unit, e.g., directly with a control system 5 or a transmitter. The communication to the control system 5 is done via a bus 4, e.g., via HART, PROFIBUS PA, PROFINET, Modbus, FOUNDATION Fieldbus, or EtherNet/IP. In addition or alternatively, it is also possible to design the interface 6 to the bus as a wireless interface, e.g., according to the WirelessHART standard (not shown). Furthermore, optionally or additionally, a 4.20 mA interface is provided. If the communication is done additionally or alternatively to a transmitter, instead of directly to the control system 5, either the bus systems mentioned above may be used for communication, or a proprietary protocol, e.g., of the "Memosens" type, is used. The Memosens protocol or field devices communicating via the Memosens protocol are distributed by the applicant.

As mentioned, an interface 6 is provided for at the bus-side part of the field device FG. The interface 6 connects the field device FG to the bus 4. In the most common wired version, the interface 6 is designed as an electrically isolating, especially inductive, interface. The interface 6 consists of two parts, with a first part on the field device side and a second part on the bus side. They can be joined via a mechanical plug connection. In one embodiment, the interface 6 is used to send data (bi-directional) and energy (uni-directional, i.e., from the superior unit 5 to the field device FG).

The field device FG also includes a wireless interface 2 for wireless communication 3, which is, for example, designed as a Bluetooth interface, WLAN interface, or a wireless connection based upon the wireless standard IEEE 802.15.4, such as Zigbee, for example. The Bluetooth interface satisfies, especially, the low energy protocol stack as "Bluetooth Low Energy" (also known as BTLE, BLE, or Bluetooth Smart). The field device FG therefore at least satisfies the "Bluetooth 4.0" standard.

Furthermore, FIG. 2 shows the wireless dongle D that is connected via the connection interface USB to a computer. The computer C is a personal computer, laptop, notebook, sub-notebook, netbook, desknote, tablet, etc. An industrial PDA is used as another alternative. The dongle D is supplied with electricity by the computer C via the interface USB.

Several field devices FG are found in a process automation technology plant. In a large facility, there are up to several hundred of these field devices FG. All field devices must be configured for their specific uses. For this purpose, certain configurations, parameters, and settings must be made within each field device. This can, for example, be accomplished via the bus 4. Then, however, the field devices FG are already in the facility and connected to the bus, which is frequently undesirable. The field devices FG are, therefore, frequently pre-configured, apart from the facility. To accomplish this, the field devices are either connected to another bus or individually connected to a corresponding configuration device. This is generally very laborious. By means of the dongle D according to the present disclosure, configuration can be performed wirelessly with several field devices FG at the same time. Accordingly, a connection can be established from a dongle D to one or more field devices FG.

A program or application that is designed to configure the field device FG runs on the computer. The applicant markets such software. A configuration for the corresponding field devices FG can be made quickly on the computer C in a user-friendly and clear-cut manner. The computer C can establish a link to the field devices FD via the wireless dongle D. Since care must be taken to prevent an attacker from manipulating the parameters while configuring the field devices FG, the aforementioned (hardware) safety measures are implemented in the dongle D.

The method according to the present disclosure for wirelessly transmitting data from the computer C via the wireless dongle D to the field device FG will be addressed below.

After the wireless dongle D is connected to a computer C, a bi-directional wireless link is established between the dongle D and field device FG. The wireless dongle D is authenticated in the field device FG by means of a key, wherein the key is saved on the wireless dongle D. In general, all sensitive data such as passwords or keys are preferably saved on the dongle D. The dongle D is, accordingly, also a key memory. No sensitive data are saved on the computer C, since, as mentioned, the computer is vulnerable to viruses or Trojans. A user on the computer C must enter the correct password. Once this authentication is successful, a data block is, in a second step, sent by the field device FG to the computer C. It is preferable for the calculations of the authentication protocol to be performed within the CPU of the dongle, since the dongle can also be exposed to attacks if the computer is infected.

The authentication of the wireless dongle D in the field device FG is performed as a multi-factor authentication, especially a two-factor authentication, including at least the factors of the password and wireless dongle or wireless dongle key. Multi-factor authentication is a system that requires more than one form of authentication in order to verify the legitimacy of the connection. Two or more independent proofs of authorization are combined, such as something known by the user (password), something that the user possesses (security token), and something that the user is (biometric verification). In the present example, this is the wireless dongle D and a password. The goal is to create a multi-layered defense. Unauthorized persons therefore have a more difficult time gaining access to the connection. If one factor is compromised or malfunctioning, the attacker must deal with at least one other barrier in order to successfully penetrate. Another possible factor would be, for example, a fingerprint that is read in by means of a suitable reader on a computer C.

In connecting, a bi-directional connection is established between the dongle D and the field device FG, and the authentication, as well as the transmission of the data block, are made resistant to unauthorized reading and alteration by means of asymmetrical encoding methods, especially, using hybrid encoding. The asymmetrical encoding method comprises methods based upon algorithm class RSA, a digital signal algorithm (DSA) based upon prime elements, a digital signal method based upon elliptical curves (ECDSA), and/or so-called PAKE protocols (password authenticated key establishment) based upon the aforementioned classes of algorithms.

The wireless dongle D or the arithmetic unit μC and the programs that run on them comprise protective measures against side channel attacks, especially run-time smoothing by constantly running code such as inserting redundancies, so as to execute machine commands independently of data and avoid conditional jumps, randomization of power consumption, physical protective measures against electromagnetic radiation, and/or insertion of noise such as code obfuscation, grid obfuscation, and/or signal noise.

If authentication with a password fails when bi-directionally establishing a connection, it is permitted to establish another bi-directional connection only after a certain time, especially after times greater than one minute. If establishment of the connection fails several times, the wait time can be increased in steps, e.g., to 2 minutes, 5 minutes, etc.

The password is, in this case, short, especially, too short to be able to be considered cryptographically secure. It has, for example, an entropy of less than 128 bits.

In the next step, the data are transmitted from the wireless dongle D or computer C to the field device FG. The data are, for example, parameter and setting data for configuring the field devices FG connected to the dongle.

What is claimed is:
1. A communication device for the wireless transmission of data from a computer, comprising:
   a connection interface for connecting the communication device to a computer, the connection interface having a plug;
   a wireless interface configured to transmit data from the communication device to a field device;
   a memory on which at least one key can be saved;
   an arithmetic unit configured to generate and to test signatures and release codes and to perform at least one asymmetrical encryption; and
   a housing,
   wherein the wireless interface, the memory, the arithmetic unit, and the connection interface are arranged in the housing, and only the plug is external to the housing,
   wherein the arithmetic unit is further configured to
      establish a bi-directional wireless connection between the communication device and the field device;
      transfer a key and a password to the field device for a two-factor authentication of the communication device in the field device;
      receive a data block from the field device when the two-factor authentication is successful; and transmit data from the communication device to the field device, wherein the transfer of the key and the password, the reception of the data block, and the transmission of the data are protected from eavesdropping by an asymmetrical encryption method.

2. The communication device according to claim 1, wherein the wireless interface implements a low-energy near-field communication protocol.

3. The communication device according to claim 2, wherein the low-energy near-field communication protocol is a Bluetooth protocol.

4. The communication device according to claim 3, wherein the Bluetooth protocol is sufficient for a low-energy protocol stack.

5. The communication device according to claim 1, wherein the communication device is cast.

6. The communication device according to claim 1, further comprising protective measures to recognize a manipulation or a removal of the housing.

7. The communication device according to claim 1, further comprising a hardware random number generator.

8. The communication device according to claim 1, wherein the connection interface is a USB interface.

9. The communication device according to claim 1, wherein the communication device is a wireless dongle.

10. A method for the wireless transmission of data from a computer to a field device of a process automation system, comprising:
   providing a communication device, including:
      a connection interface for connecting the communication device to the computer, the connection interface having a plug;
      a wireless interface configured to transmit data from the communication device to the field device;
      a memory on which one key can be saved;
      an arithmetic unit configured to generate and to test signatures and release codes and to perform at least one asymmetrical encryption; and
      a housing, wherein the wireless interface, the memory, the arithmetic unit, and the connection interface are arranged in the housing, and only the plug is external to the housing;
   connecting the communication device to the computer;
   establishing a bi-directional wireless connection between the communication device and the field device;
   authenticating the communication device in the field device using a key, wherein the key is saved on the communication device, wherein the authentication of the communication device in the field device includes a two-factor authentication using the key and a password;
   transmitting a data block from the field device to the communication device when authentication is successful; and
   transmitting data from the communication device to the field device, wherein the authentication of the communication device, the transmission of the data block, and the transmission of the data are protected from eavesdropping by an asymmetrical encryption method.

11. The method according to claim 10, wherein the asymmetrical encryption method includes a method based upon algorithm class RSA, a digital signal algorithm based upon prime elements, and/or a digital signal method based upon elliptical curves.

12. The method according to claim 10, further comprising executing protective measures against side channel attacks, especially run-time smoothing by constantly running code such as inserting redundancies, so as to execute machine commands independently of data and avoid conditional jumps, randomization of power consumption, physical protective measures against electromagnetic radiation, and/or insertion of noise such as code obfuscation, grid obfuscation, and/or signal noise.

13. The method according to claim 10, wherein the asymmetrical encryption method uses hybrid encryption.

* * * * *